(12) United States Patent
Birth

(10) Patent No.: US 10,924,000 B2
(45) Date of Patent: Feb. 16, 2021

(54) DC-DC CONVERTER WITH REDUCED RIPPLE

(71) Applicant: NOVUM ENGINEERING GMBH, Dresden (DE)

(72) Inventor: Sören Birth, Dresden (DE)

(73) Assignee: NOVUM engineering GmbH, Dresden (DE)

( * ) Notice: Subject to any disclaimer, the term of this patent is extended or adjusted under 35 U.S.C. 154(b) by 0 days.

(21) Appl. No.: 16/667,221

(22) Filed: Oct. 29, 2019

(65) Prior Publication Data

US 2020/0067413 A1  Feb. 27, 2020

Related U.S. Application Data

(63) Continuation of application No. 16/063,320, filed as application No. PCT/DE2016/100608 on Dec. 21, 2016, now Pat. No. 10,498,240.

(30) Foreign Application Priority Data

Dec. 22, 2015 (DE) .................... 10 2015 122 567

(51) Int. Cl.
*H02M 1/14* (2006.01)
*H02M 3/158* (2006.01)
(Continued)

(52) U.S. Cl.
CPC ............... *H02M 1/14* (2013.01); *H02M 3/07* (2013.01); *H02M 3/158* (2013.01);
(Continued)

(58) Field of Classification Search
CPC ................ H02M 3/1584; H02M 3/07; H02M 2001/0083; H02M 2003/1557;
(Continued)

(56) References Cited

U.S. PATENT DOCUMENTS

| 5,486,752 A | 1/1996 | Hua et al. |
| 5,736,842 A | 4/1998 | Jovanovic |

(Continued)

FOREIGN PATENT DOCUMENTS

| CN | 101640478 A | 2/2010 |
| CN | 102665322 A | 9/2012 |

(Continued)

OTHER PUBLICATIONS

International Search Report issued by the European Patent Office in International Application PCT/DE2016/100608.

(Continued)

*Primary Examiner* — Alex Torres-Rivera
(74) *Attorney, Agent, or Firm* — Ursula B. Day, Esq.

(57) ABSTRACT

A DC/DC converter is provided which can be produce easily and inexpensively with an alternating current component with which a superimposed direct current is reduced in an output voltage (ripple). A C+DC/DC converter includes an input and output, a series arm which is arranged between the input and the output and in which at least one first inductor and first capacitor are arranged, and a capacitor arranged in a first shunt arm at the output. A second shunt arm arranged parallel to the first shunt arm is equipped with a first switch and a second switch arranged in series and a second inductor such that the first connection of the inductor is connected to a point between the first inductor and the first capacitor and the second connection of the inductor is connected to a point between the first and the second switch.

8 Claims, 4 Drawing Sheets

(51) Int. Cl.
    *H02M 3/07* (2006.01)
    *H02M 1/34* (2007.01)
    *H02M 3/155* (2006.01)
    *H02M 1/00* (2006.01)

(52) U.S. Cl.
    CPC .. *H02M 3/1584* (2013.01); *H02M 2001/0083* (2013.01); *H02M 2001/342* (2013.01); *H02M 2003/1557* (2013.01)

(58) Field of Classification Search
    CPC .......... H02M 1/14; H02M 1/143; H02M 1/15; H02M 1/4225; H02M 7/219; H02M 1/34; H02M 2001/342; H02M 2001/344
    USPC ......................................................... 323/207
    See application file for complete search history.

(56) References Cited

U.S. PATENT DOCUMENTS

| 6,008,589 | A | 12/1999 | Deng et al. | |
|---|---|---|---|---|
| 6,341,076 | B1 | 1/2002 | Kadatskyy et al. | |
| 2006/0226816 | A1* | 10/2006 | Wai | H02M 3/158 323/222 |
| 2014/0313627 | A1 | 10/2014 | Li et al. | |
| 2015/0115926 | A1 | 4/2015 | Song et al. | |
| 2015/0222178 | A1 | 8/2015 | Skinner et al. | |
| 2016/0226372 | A1* | 8/2016 | Willenberg | H02M 3/1584 |

FOREIGN PATENT DOCUMENTS

| CN | 104734496 A | 6/2015 |
|---|---|---|
| DE | 28 51 095 A1 | 5/1980 |
| DE | 692 23 477 T2 | 7/1998 |
| EP | 0 534 422 A2 | 3/1993 |

OTHER PUBLICATIONS

Dodi Garinto: A new Zero-Ripple Boost Converter with Separate Inductors for Power Factor Correction. In: 2007 IEEE Power Electronics Specialists Conference.
J.W. Kolar; N. Mohan; F. C. Zach: Novel aspects of an application 'zero'-ripple techniques to basic converter topologies. In: Power Electronics Specialists Conference, 1997. PESC '97 Record; 28$^{th}$ Annual IEEE (vol. 1): Jun. 22-27, 1997, p. 796-803, vol. 1.
Chinese Search Report dated Oct. 29, 2019 with respect to counterpart Chinese patent application 2016800758632.
Translation of Chinese Search Report dated Oct. 29, 2019 with respect to counterpart Chinese patent application 2016800758632.

* cited by examiner

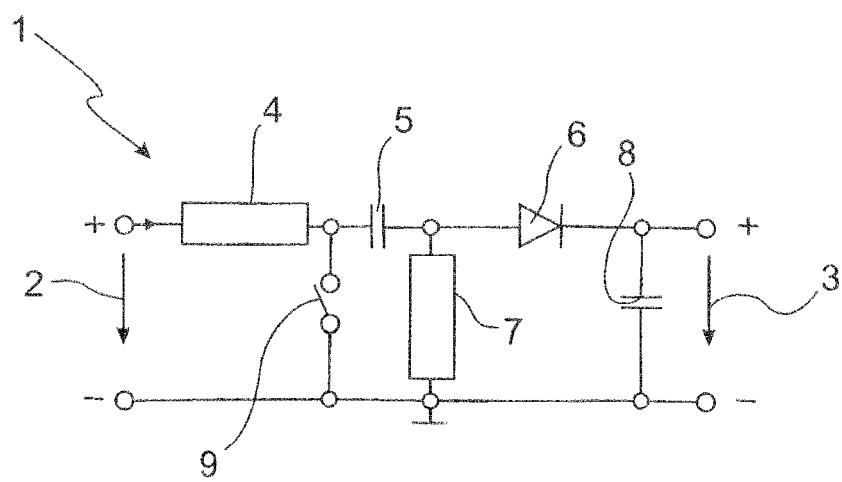
Prior Art  Fig. 1
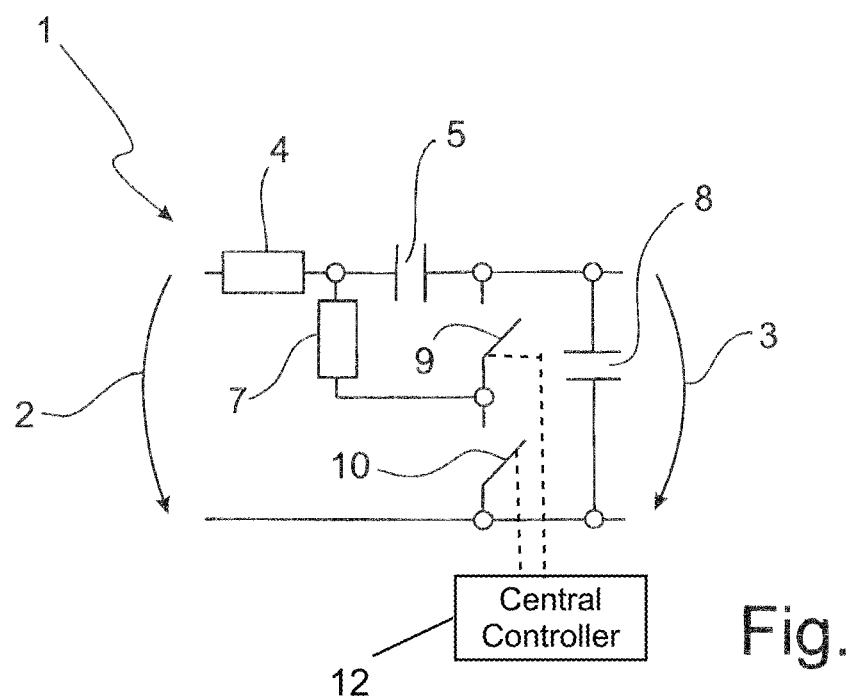
Fig. 2

DC-DC CONVERTER WITH REDUCED RIPPLE

CROSS-REFERENCES TO RELATED APPLICATIONS

This application is a continuation of U.S. application Ser. No. 16/063,320, filed on Jun. 18, 2018, which is the U.S. National Stage of International Application No. PCT/DE2016/100608, filed Dec. 21, 2016, which designated the United States and has been published as International Publication No. WO 2017/108033 A1 and which claims the priority of German Patent Application, Serial No. 10 2015 122 567.0, filed Dec. 22, 2015, pursuant to 35 U.S.C. 119(a)-(d) the description of which is hereby incorporated by reference.

BACKGROUND OF THE INVENTION

The invention relates to a DC/DC converter having an input and an output, a longitudinal arm arranged between the input and the output, in which at least a first inductor and a first capacitor are arranged, and a capacitor arranged in a first shunt arm at the output, and another shunt arm with different arrangements of a second inductor and two switches.

In many areas of technology it is necessary to convert an available DC voltage to operate connected loads. Such a conversion of an available so-called supply input voltage Ue can be performed, for example, with a DC/DC converter, wherein the DC/DC converter can generate for the connected loads an output voltage Ua which is smaller or larger than the input voltage Ue.

Such DC converters find application, for example, in machines or industrial plants, in a variety of electronic devices and in vehicle manufacturing. For example, such DC converters are customary in so-called switching power supplies, which are often used in computers, notebooks, mobile phones, hi-fi devices and small motors.

The advantages of such converters are improved efficiency and reduced heat generation.

To convert the electrical energy, so-called clocked converters are typically used as DC/DC converters, which are controlled with a control signal, which determines the clock signal for switching the single switch arranged in the converter. Customarily, one or more passive electrical storage devices, such as capacitors and/or inductors, are arranged in such converters. The operating principle for converting an input voltage into an output voltage is a controlled cyclic charging and discharging of the passive electrical storage devices.

For example, active, electrical semiconductor switches such as a BJT (Bipolar Junction Transistor), a MOSFET (Metal-Oxide-Semiconductor Field-Effect-Transistor) or an IGBT (Insulated Gate Bipolar Transistor) are used instead of a switch required in the DC/DC converter.

The result at the input and/or output of power controller is a triangular current curve or voltage curve due to the cyclic charging and discharging of the passive electrical storage devices, such as capacitors and/or inductors. This effect is also referred to as ripple and represents an alternating current of an arbitrary frequency and waveform superimposed on a direct current. Also used is the concept of a pulsating direct current.

These high-frequency ripples generate harmonics which cause disturbances in other connected electronic components. To limit these interfering electromagnetic fields, attempts are generally made to attenuate the ripple by using larger or additionally employed components. Such approaches can be found in "A 'Zero' Ripple Technique Applicable To Any DC Converter" David C. Hamill, Surrey Space Center, University of Surrey, Guildford, UK, d.hamill@surrey.ac.uk and in Ripple Steering AC-DC Converters to Minimize Input Filter, Eric CHOU, Frank CHEN, Claudio Adragna, Bruce LU.

Furthermore, ideas have been proposed to reduce ripple by additional active sources, as disclosed in Techniques for Input Ripple Current Cancellation: Classification and Implementation, N. K. Poon, J. C. P. Liu, C. K. Tse and M. H. Pong. Alternatively, modifications to minimize disturbances with coupled inductors are also known from AN3180, Application Note, A 200 W ripple-free input current PFC pre-regulator with the L6563S, (c) 2010 STMicroelectronics.

SUMMARY OF THE INVENTION

The object of the invention is to provide a DC/DC converter, which is simple and inexpensive to produce and whose alternating current component which is superimposed on a direct current in an output voltage (ripple) is reduced.

The object is achieved by a device having the features according to claim 1, 3, 5 or 7 of the independent claims. Further developments are recited in the dependent claims 2, 4, 6 and 8.

It is contemplated to implement the DC/DC converter in such a way that at least an inductor and a capacitor are arranged in a longitudinal arm. An additional capacitor is arranged in an output-side shunt arm. In a first variant, two switches are arranged in a parallel circuit connected in parallel with this output-side shunt arm, wherein a center tap between these two switches is connected with a first terminal of a further inductor. The second terminal of this inductor is connected to a point between the inductor arranged in the longitudinal arm and the capacitor.

In an alternative embodiment of the DC/DC converter, it is provided to arrange an inductor and a switch in the further shunt arm instead of the two switches. In this series connection, the position of the two components may also be interchanged. The point located between the two components is connected to a terminal of a first switch whose second terminal is connected to a point between the inductor and the capacitor arranged in the longitudinal arm.

Advantageously, active semiconductor switches may be used for the switches in the DC/DC converter.

These active semiconductor switches may be, for example, a BJT, a MOSFET or an IGBT. However, possible embodiments are not limited to these listed semiconductor switches.

BRIEF DESCRIPTION OF THE DRAWING

Further details, features and advantages of embodiments of the invention will become apparent from the following description of exemplary embodiments with reference to the appended drawings where:

FIG. 1: is a prior art DC/DC converter (SEPIC-Converter),

FIG. 2 is a first implementation of the DC/DC converter according to the invention.

DETAILED DESCRIPTION OF PREFERRED EMBODIMENTS

Figure 3:
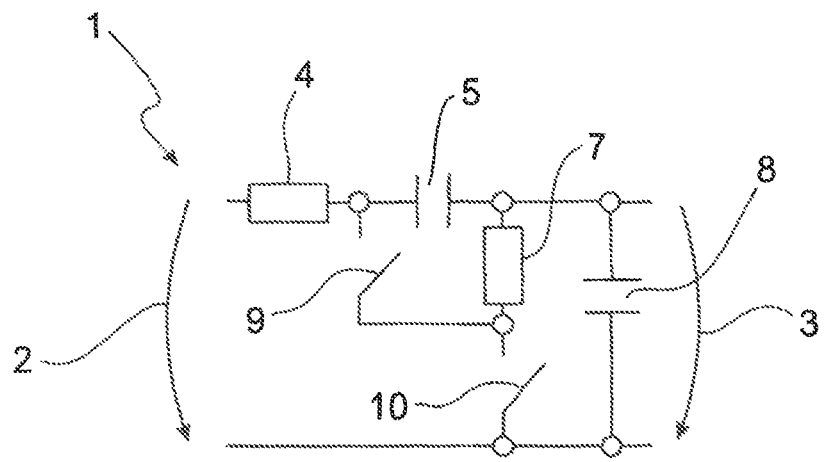
FIG. 3: is a second implementation of the DC/DC converter according to the invention.

FIG. 1 shows a prior art DC/DC converter 1. The illustrated DC/DC converter 1 is a so-called SEPIC-Converter (SEPIC—Single Ended Primary Inductor Converter), which was selected as a representative example of the group of non-galvanically separating converters which are constructed with passive 4 storage devices, for example two capacitors and two inductors. The characteristic of this DC/DC converter enables operation in such a way that the output voltage can be smaller or greater than the input voltage.

The DC/DC converter 1 has an input 2 to which an input voltage Ue can be applied, and an output 3 at which an output voltage Ua is supplied that has been converted by the DC/DC converter 1. The DC/DC converter 1 may supply an output voltage Ua which may be larger or smaller than the input voltage Ue.

The DC/DC converter 1 has in a longitudinal arm a first inductor 4, a first capacitor 5 and a diode 6. In an output-side shunt arm, a second capacitor 8 is arranged in parallel with a load resistor connected to the output 3, which is not shown in FIG. 2. In a further shunt arm, a second inductor 7 is arranged between the first capacitor 5 and the diode 6. A first switch 9 is also arranged in a third shunt arm between the first inductor 4 and the first capacitor 5.

When the switch 9 in the DC/DC converter 1 shown in FIG. 1 is closed, the input voltage is present at the first inductor 4. Simultaneously, a voltage having a value corresponding of the input voltage at the input 2 is present at the first capacitor 5. The current flowing through the first and second inductor 4 and 7 increases, with energy being stored in the inductors 4 and 7.

At this time, the second capacitor 8 arranged at the output side supplies the output current for a connected load or a consumer, since the diode 6 is blocking. When the switch 9 is opened, the polarity of the voltages at the first and second inductors 4 and 7 is reversed. The diode 6 turns on and supplies the stored energy to the second capacitor 8 and thus also to the connected load.

FIG. 2 shows a first implementation of the DC/DC converter 1 according to the invention. The DC/DC converter 1 has in its longitudinal arm, i.e. between its input 2 and its output 3, at least a first inductor 4 and a first capacitor 5. A second capacitor 8, which is connected in parallel to an unillustrated load at the output 3, is arranged in an output-side shunt arm.

A first switch 9 and a second switch 10 connected in series are also arranged parallel to the output 3 and the second capacitor 8. A second inductor 7 is disposed between the first inductor 4 and the first capacitor 5 and a terminal disposed between the series-connected switches 9 and 10.

Preferably, the switches 9 and 10 are implemented as active semiconductor switches. For example, BJT (Bipolar Junction Transistor), MOSFET (Metal-Oxide-Semiconductor Field-Effect Transistor), IGBT (Insulated-Gate Bipolar Transistor) or others switches may be used.

It is contemplated to control the switches with a control signal generated by a central controller 12 shown in FIG. 2. The central controller 12 provides the control signals for the mechanical or electronic switches 9 and 10 such that the switches 9 and 10 are activated alternately. Thus, the switch 9 is closed when the switch 10 is opened and vice versa.

In the circuit arrangement according to the invention shown in FIG. 2, the direction of the current flow is dependent on a selected duty cycle of the control signals of the switches 9 and 10 as well as on the voltages Ue and Ua present at the input 2 and at the output 3.

The switches 9 and 10 can be controlled using the method of state-space averaging and a special form of zero-voltage switching, wherein the oscillating circuit is arranged parallel to the switch and is actively excited to oscillate by an additional switching pulse.

The DC/DC converter 1 in FIG. 2 is able to generate from an input voltage Ue applied to the input 2 a larger output voltage Ua at the output 3. In such a DC/DC converter 1, ripple is reduced in accordance with the invention, i.e. the pulsating direct current at the input 2 is smaller. The input can be interchanged with the output, thus reversing the operation. When an input voltage Ue is applied to the output 3 and the DC/DC converter 1 is controlled accordingly, an output voltage Ua is supplied at the input 2 which is, for example, less than Ue.

In the event that the operation of the DC/DC converter is reversed, the reduced ripple is no longer present at the input side of the converter, but rather at the output side.

FIG. 3 shows a second Implementation of the DC/DC converter 1 according to the invention. The DC/DC converter 1 has in its longitudinal arm, between its input 2 and its output 3, at least a first inductor 4 and a first capacitor 5. A second capacitor 8, which is connected in parallel to an unillustrated load at the output 3, is arranged in an output-side shunt arm.

Moreover, a second inductor 7 and a second switch 10 connected in series are arranged in parallel with the output 3 and the second capacitor 8. A first switch 9 is arranged between the first inductor 4 and the first capacitor 5 and a terminal disposed between the second inductor 7 and the first switch 9.

Figure 4:
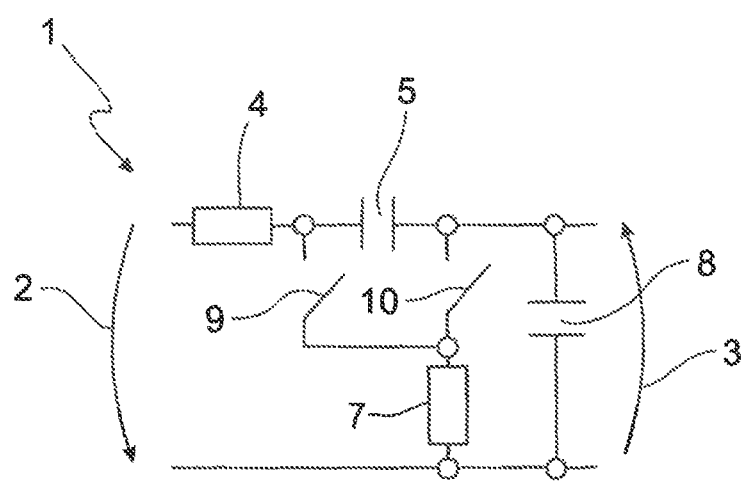
FIG. 4 is a third implementation of the DC/DC converter according to the invention.

FIG. 4 shows a third implementation of the DC/DC converter 1 according to the invention. The DC/DC converter 1 has in its longitudinal arm between its input 2 and its output 3 at least a first inductor 4 and a first capacitor 5. A second capacitor 8, which is connected in parallel to an unillustrated load at the output 3, is arranged in an output-side shunt arm.

Likewise, a second switch 10 and a second inductor 7 connected in series are arranged parallel to the output 3 and the second capacitor 8. A second switch 9 is connected between the first inductor 4 and the first capacitor 5 and a terminal disposed between the series-connected elements switch 10 and second inductor 7.

In the DC/DC converter 1 shown in FIG. 4, the polarity of the voltage at the output 3 is inverted.

The switches 9 and 10 can be controlled by the method of state-space averaging as well as a special form of zero-voltage switching, wherein the oscillating circuit is parallel to the switch and is actively excited to oscillate by an additional switching pulse.

In the event that an active semiconductor switch, such as an IGBT or a MOSFET, is used for the switches 9 and/or 10, these switches 9 and/or 10 form a diode in a state in which the switch 9 and/or 10 is/are not activated. This diode allows a directed current flow. In the case where one or both switches 9 and/or 10 is/are activated, the semiconductor switches have a very low transfer resistance and enable current flow in any direction.

Figure 5:
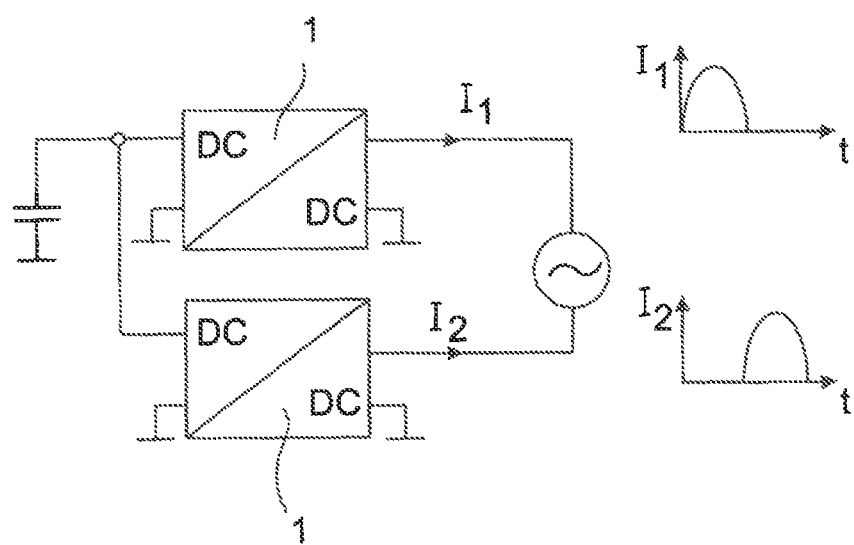
FIG. 5 is an application of the DC/DC converter according to the invention in an AC bridge.

FIG. 5 shows an application of the DC/DC converter 1 in an AC bridge. In order to generate, for example, a sinusoidal AC voltage required for a load, such as a motor, two DC/DC converters 1 are used. A voltage source is connected on the input side to the inputs of both DC/DC converters 1. The DC/DC converter 1 shown in the upper part of FIG. 5 generates a positive half-wave in response to corresponding control signals for the switches 9 and 10 in the DC/DC converters 1. This is shown in FIG. 5 in a small diagram with a current-time profile of the current I1. The negative half-wave is generated by the lower DC/DC converter 1. The corresponding profile of the current I2 is also shown in a small diagram.

Figure 6:
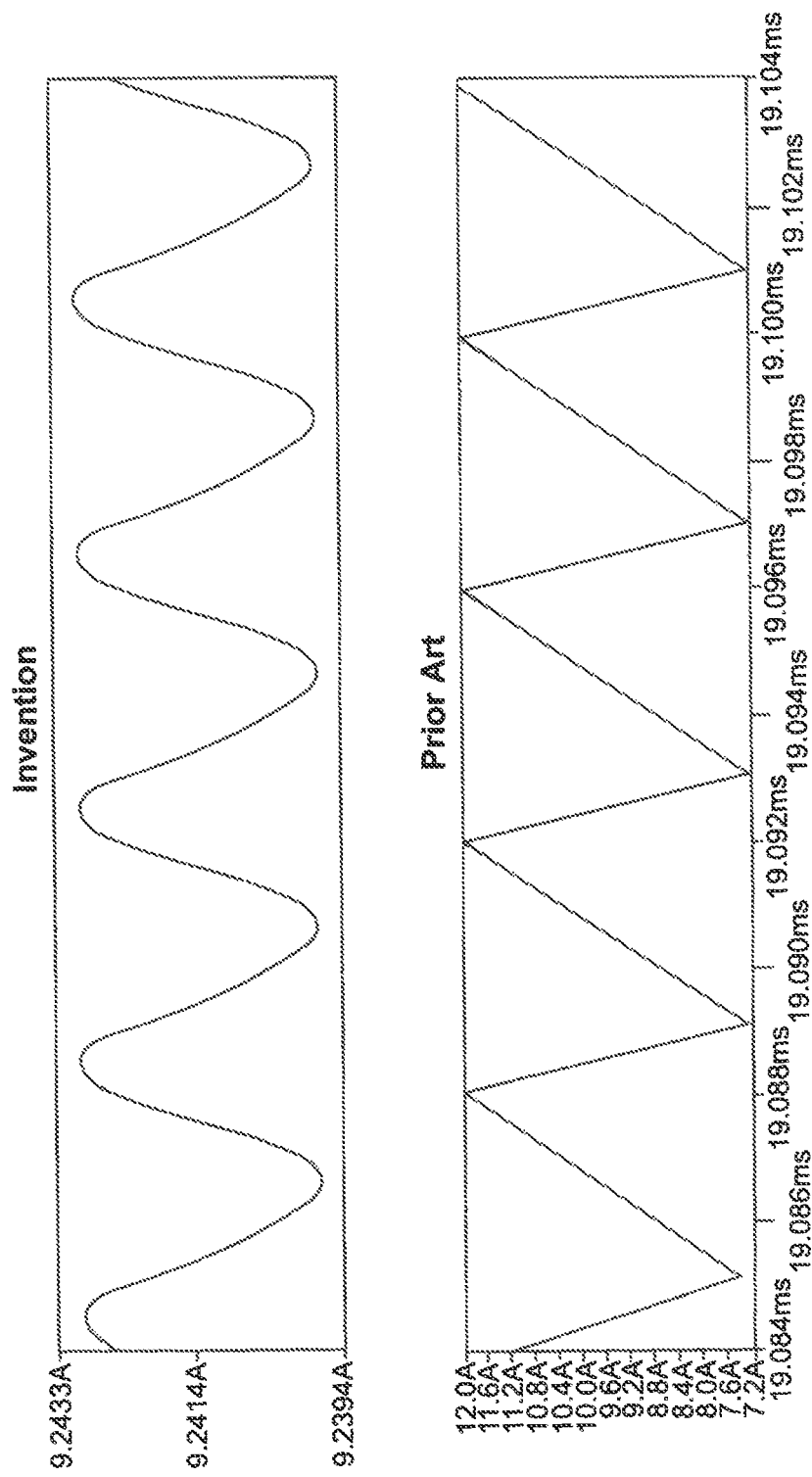
FIG. 6 is a graphical representation of detected ripple in comparison between the prior art and the present invention.

It has been demonstrated, when comparing a DC/DC converter 1 according to the invention of FIG. 2 with a prior art SEPiC-Converter that the disturbing ripple could be greatly reduced. As shown in part in FIG. 6, comparative measurements have shown that the SEPIC-Converter, shown in the upper part of the current-time profile, exhibits ripple currents in the range of about 4 A, whereas the converter according to the invention shown in the lower part of the current-time profile, had a ripple current in the range of about 4 mA. Thus, the ripple could be greatly minimized by virtue of the invention.

The invention can be used in many areas for the conversion of electrical energy, such as in the
  Unidirectional or bidirectional DC/DC conversion,
  Extension of DC version to an AC bridge,
  impedance spectroscopy of energy sources (low ripple),
  Control of electric motors or
  Battery charging in battery management systems.

An exemplary application of the invention in impedance spectroscopy will be described below.

The characteristic impedance of an electrochemical energy source, such as an accumulator or a fuel cell, provides information about the internal states of the source, in order to measure the impedance, the source is either supplied with a targeted disturbing current and the voltage response is measured, or a disturbance voltage is superposed on the source, and the reaction of the current is detected. In both cases, the ripple current or the ripple voltage is superposed on this targeted interference signal. The effect of the ripple current can be significantly reduced with the illustrated invention, thus allowing a significantly improved impedance measurement, which is hardly affected by disturbances.

The DC/DC converter according to the invention advantageously reduces ripple without the need to resort to additional, larger or different components in the DC/DC converter circuit. Another advantage is that the components used in the DC/DC converter have no specific dimensioning requirements.

What is claimed is:

1. A DC/DC converter comprising:
   an input and an output,
   a longitudinal arm arranged between the input and the output and having at least a first inductor and a first capacitor,
   a first shunt arm connected across the output,
   a second shunt arm having a first active semiconductor switch and a second active semiconductor switch and forming a serial circuit having two end connection points which are connected directly to respective terminals of the output, and a center connection point, wherein a terminal of the first active semiconductor switch facing away from the second active semiconductor switch is connected directly to a terminal of the first capacitor of the longitudinal arm and is connected directly to the output, and
   a second inductor having a first terminal connected to a point between the first inductor and the first capacitor and a second terminal connected to the center connection point, and
   a controller providing control signals to the first and second active semiconductor switches such that the first and second active semiconductor switches are activated alternately, closing the first active semiconductor switch is when the second active semiconductor switch is opened and vice versa, wherein the input and the output are interchangeable, thereby allowing bi-directional operation of the DC-to-DC converter.

2. The DC-to-DC converter according to claim 1, wherein the first and second active semiconductor switches are a BJT (Bipolar Junction Transistor), a MOSFET (Metal-Oxide-Semiconductor Field-Effect-Transistor) or an IGBT (Insulated Gate Bipolar Transistor).

3. A DC/DC converter comprising:
   an input having an applied input voltage with a first polarity,
   an output generating an output voltage with a second polarity,
   a longitudinal arm arranged between the input and the output and having a first inductor and a first capacitor,
   a first shunt arm connected across the output,
   a second shunt arm connected parallel to the first shunt arm and having a second active semiconductor switch and a second inductor connected in series, wherein a terminal of the second active semiconductor switch facing away from the second inductor is connected directly to the output, and a first active semiconductor switch having a first terminal connected to a point between the second active semiconductor switch and the second inductor and a second terminal connected to a point between the first inductor and the first capacitor,
   wherein the second polarity is inverted with respect to the first polarity.

4. The DC-to-DC converter according to claim 3, wherein the first and second active semiconductor switches are a BJT (Bipolar Junction Transistor), a MOSFET (Metal-Oxide-Semiconductor Field-Effect-Transistor) or an IGBT (Insulated Gate Bipolar Transistor).

5. A method for operating a DC-to-DC converter, comprising:
   connecting a first inductor and a first capacitor in series between an input and an output of the DC-to-DC converter,
   connecting a first shunt arm across the output,
   forming a second shunt arm of a serial circuit consisting of a first active semiconductor switch and a second active semiconductor switch, the serial circuit having two end connection points, which are connected directly to respective terminals of the output, and a center connection point, wherein a terminal of the first active semiconductor switch facing away from the second active semiconductor switch is connected directly to a terminal of the first capacitor and is connected directly to the output,
   connecting a first terminal of a second inductor to a point between the first inductor and the first capacitor and connecting a second terminal of the second inductor to the center connection point, and
   alternately activating the first and second active semiconductor switches such that the first active semiconductor switch is closed when the second active semiconductor switch is opened and vice versa, further comprising interchanging the input and the output and performing bi-directional operation of the DC-to-DC converter.

6. The method of claim 5, wherein the first and second active semiconductor switches are a BJT (Bipolar Junction Transistor), a MOSFET (Metal-Oxide-Semiconductor Field-Effect-Transistor) or an IGBT (Insulated Gate Bipolar Transistor).

7. A method for operating a DC-to-DC converter, comprising connecting a first inductor and a first capacitor in series between an input and an output of the DC-to-DC converter, connecting a first shunt arm across an output, forming a second shunt arm of a serial circuit consisting of a second inductor and a second active semiconductor switch, connecting a terminal of the second active semiconductor switch facing away from the second inductor directly to the output, connecting a first terminal of a first active semiconductor switch to a point between the second active semiconductor switch and the second inductor, connecting a second terminal of the first active semiconductor switch to a point between the first inductor and the first capacitor, applying to the input an input voltage with a first polarity, and generating at the output of the De-to-DC converter an output voltage with a second polarity that is inverted with respect to the first polarity.

8. The method of claim 7, wherein the first and second active semiconductor switches are a BJT (Bipolar Junction Transistor), a MOSFET (Metal-Oxide-Semiconductor Field-Effect-Transistor) or an IGBT (Insulated Gate Bipolar Transistor).

* * * * *